United States Patent [19]

Honma et al.

[11] Patent Number: 4,785,029

[45] Date of Patent: Nov. 15, 1988

[54] FRICTION MATERIAL COMPOSITION FOR BRAKE LINING

[75] Inventors: Toru Honma; Kenji Kakihara, both of Okazaki; Makoto Ozawa, Nagoya, all of Japan

[73] Assignee: Toyota Jidosha Kabushiki Kaisha, Toyota, Japan

[21] Appl. No.: 34,416

[22] PCT Filed: Jul. 9, 1986

[86] PCT No.: PCT/JP86/00348

§ 371 Date: Mar. 9, 1987

§ 102(e) Date: Mar. 9, 1987

[87] PCT Pub. No.: WO87/00192

PCT Pub. Date: Jan. 15, 1987

[30] Foreign Application Priority Data

Jul. 9, 1985 [JP] Japan ................................ 60-151044
Jul. 10, 1985 [JP] Japan ................................ 60-151937
Jul. 18, 1985 [JP] Japan ................................ 60-158792
Jul. 18, 1985 [JP] Japan ................................ 60-158793

[51] Int. Cl.$^4$ ............................ C08K 7/14; C08K 3/20
[52] U.S. Cl. ................................... 523/153; 523/155; 523/156
[58] Field of Search .................... 523/153, 155, 156

[56] References Cited

U.S. PATENT DOCUMENTS

| | | | |
|---|---|---|---|
| 3,434,998 | 3/1969 | Aldrich et al. | 523/153 |
| 4,373,038 | 2/1983 | Moraw et al. | 523/155 |
| 4,374,211 | 2/1983 | Gallagher et al. | 523/153 |

FOREIGN PATENT DOCUMENTS

| | | | |
|---|---|---|---|
| 57-108180 | 7/1982 | Japan . | |
| 57-147572 | 9/1982 | Japan . | |
| 57-147573 | 9/1982 | Japan | 523/153 |
| 57-205472 | 12/1982 | Japan . | |
| 57-205473 | 12/1982 | Japan . | |
| 59-45383 | 3/1984 | Japan . | |
| 59-206435 | 11/1984 | Japan . | |
| 59-206436 | 11/1984 | Japan . | |

Primary Examiner—Lewis T. Jacobs
Attorney, Agent, or Firm—Oblon, Fisher, Spivak McClelland & Maier

[57] ABSTRACT

A molded resin friction material composition for automobiles or the like. This composition contains as base fibers chopped glass fibers and pulped polyamide fibers in a given compounding ratio. This composition enables to produce brake lining having a high friction coefficient, a low wear ratio, and an improved fade. The fade can be further improved by adding cryolite powder and zirconium oxide powder to the composition.

12 Claims, 9 Drawing Sheets

FRICTION MATERIAL COMPOSITION FOR BRAKE LINING

FIELD OF THE INVENTION

This invention concerns a composition of frictional materials for use in brake linings of automobiles or the likes.

BACKGROUND OF THE INVENTION

Heretofore, a mold type composition of frictional material using asbestos as matrix fibers and a phenolic resin as a binder has generally been employed as composition of frictional materials for use in brake linings. This conventional molded type composition of frictional material for use in brake linings contains as a binder an organic substance which is thermally decomposed at high temperature, and therefore fadings, i.e., lowering of the frictional coefficient compared to the required coefficient, are resulted. Recently, the brake linings using glass fibers or aromatic polyamide fibers instead of asbestos have been reported, as disclosed in Japanese Patent Laid-Open Publications Nos. SHOWA 53-130742 and SHOWA 56-16579. Since aromatic polyamide fibers are organic substances as well as a phenolic resin, fadings are resulted when aromatic polyamide fibers are thermally decomposed in braking. Also, Japanese Patent Laid-Open Publication No. SHOWA 57-205473 discloses the cryolite powder is blended in a composition of frictional material for use in brake linings an inorganic grain.

As described above, for the conventional composition of frictional material for use in brake linings containing asbestos as matrix fibers, there has been known such problems that the friction coefficient is substantially low or fadings are resulted when brakes are frequently operated. While, a mold type composition of frictional material for use in brake linings containing aromatic polyamide fibers as matrix fibers and a phenolic resin as a binder, possibly lowers the anti-fading performance because of containing a large quantity of the organic substances.

The object of this invention is to provide a new molded type composition for use in brake linings by using polyparaphenylene terephthalamide as matrix fibers of a superior anti-fading performance and a phenolic resin as a binder in order to exhibit a high friction coefficient and a lower wear ratio.

DISCLOSURE OF THE INVENTION

The feature of the composition of frictional material for use in brake linings according to the present first invention resides in that, matrix fibers are composed of chopped glass fibers and pulped aromatic polyamide fibers, and the blending ratio of said chopped glass fibers to said pulped aromatic polyamide fibers is from 2:3 to 4:1 by volume ratio and the composition ratio of the matrix fibers is from 40 to 60% by volume based on 100% by volume (hereinafter, "%" means by volume unless otherwise specified) of the total composition.

The feature of the composition of frictional material for use in brake linings according to the present second invention resides in that, matrix fibers are composed of chopped glass fibers and pulped aromatic polyamide fibers, the blending ratio of said chopped glass fibers to said pulped aromatic polyamide fibers is from 1:9 to 7:3 by volume ratio and the composition ratio of the matrix fibers is from 30 to 40% based on 100% of the total composition.

The feature of the composition of frictional material for use in brake linings according to the present third invention resides in that, matrix fibers are composed of chopped glass fibers and pulped aromatic polyamide fibers, and blending ratio of the chopped glass fibers to the pulped aromatic polyamide fibers is from 1:9 to 1:1 by volume ratio and the composition ratio of the matrix fibers is from 15 to 30% based on 100% of the total composition.

The chopped glass fibers used in the present invention have from 1 to 6 mm of fiber length and from 5 to 13 um of fiber diameter. The pulped aromatic polyamide fibers constitute, together with the chopped glass fibers, the matrix fibers. The aromatic polyamide fibers are composed of a plurality of linear polymers polymerized from monomers including aromatic monomers through amide couplings. The polymers are extended linearly due to the steric hindrance of atoms constituting the polymer. Typical aromatic polyamide fibers are polyparaphenylene terephthalamide fibers. The polyparaphenylene terephthalamide fibers are marketed under the registered trade name "Kevlar ®". Polyparaphenylene terephathalamide is a polymer in which paraphenylene terephthalamide constitutes more than 50 mol %, preferably more than 70 mol % of the repeating unit (monomer). Polymetaphenylene isophthalamide fibers are also known as aromatic polyamide fibers, however, the anti-fading performance becomes inferior when polymetaphenylene isophthalamide fibers are used as matrix fibers. The pulped aromatic polyamide fibers are prepared by partially grinding the aromatic polyamide fibers, so that the fibers are partially split and disconnected into a shape of pulps.

The composition ratio of chopped glass fibers and pulped aromatic polyamide fibers constituting the matrix fibers, and the blending ratio of total matrix fibers having an effect on the wear ratio and the friction coefficient of the composition of the frictional material. In a case where the blending ratio of total matrix fibers is within a range from 15 to 30%, the wear ratio is remarkably increased as the composition volume ratio of the chopped glass fibers to the pulped aromatic polyamide fibers increases (hereinafter, the ratio means volume ratio). Further, the friction coefficients are high through all the composition ratios of the chopped glass fibers and the pulped aromatic polyamide fibers, and tends to be higher in accordance with increase of the composition ratio of the chopped glass fibers. Considering the wear ratio and the friction coefficient, the composition ratio of the chopped glass fibers to the pulped aromatic polyamide fibers is, desirably, from 1:1 to 1:9. If the composition ratio of the chopped glass fibers to the pulped aromatic polyamide fibers is increased in excess of 1:1, namely, if the ratio of the chopped glass fibers is increased more than that, the wear ratio is increased. While, on the other hand, if the composition ratio of the chopped glass fibers to the pulped aromatic polyamide fibers goes below 1:9, the wear ratio is worsened or the friction coefficient is lowered.

In a case where the blending ratio of total matrix fibers is within a range from 30 to 40%, the composition ratio of the chopped glass fibers to the pulped aromatic polyamide fibers is, preferably, from 1:9 to 7:3. If the composition ratio of the chopped glass fibers to the pulped aromatic polyamide fibers is in excess of 7:3, namely, if the composition ratio of the chopped glass fibers increases more than that, the wear ratio is increased. On the other hand, if the composition ratio goes below 1:9, the wear ratio is also increased.

Further, in a case where the blending ratio of total matrix fibers is within a range from 40 to 60%, the composition ratio of the chopped glass fibers to the pulped aromatic polyamide fibers is, preferably, from 2:3 to 4:1. Both in the cases where the composition ratio of the chopped glass fibers to the pulped aromatic polyamide fibers is less than 2:3 or greater than 4:1, the wear ratio increases.

A phenolic resin type binder is preferably used as a binder. The phenolic resin type binder means the binders which are mainly composed of resins prepared through condensation of one or more types of phenols, such as phenol and cresol, with formaldehyde or a formaldehyde-forming compound. Modified phenolic resins which are modified with cashew nut oil, polyvinyl vutyral, vegetable oil, melamine or an epoxy compound may be used. However straight phenolic resins are preferred, since fadings are less resulted.

The blending ratio of the phenolic resin type binder is, preferably, from 17 to 23%. The strength of resulting brake linings is insufficient if said blending ratio is less than 17%, and on the other hand, necessary porosity cannot be ensured and the anti-fading performance is worsened if said blending ratio exceeds 23%.

The organic and inorganic powdery blending agents usable herein can include a friction conditioner such as graphite, molybdenum disulfide, lead sulfide and antimony trisulfide; organic dust such as cashew dust; metal powder such as of copper and brass; and an inorganic blending agent such as barium sulfate, magnesium oxide, zirconium oxide and cryolite. The blending ratio of the organic and inorganic powdery blending agent is preferably from 47 to 68% in a case where the blending ratio of the total matrix fibers is within a range from 15 to 30%. In this case, it is preferable that the friction conditioner is blended approximately from 10 to 30%, the organic dust from 3 to 10%, the metal powder from 3 to 10% and the inorganic blending agent from 10 to 50%. In a case where the blending ratio of total matrix fibers is from 30 to 40%, the blending ratio of the organic and inorganic powdery blending agent is preferably from 37 to 53%. In this case, it is preferable that the friction conditioner is blended approximately from 10 to 25%, the organic dust from 3 to 10%, the metal powder from 3 to 10% and the inorganic blending agent from 10 to 40%. In a case where the blending ratio of total matrix fibers is within a range from 40 to 60%, the preferred blending ratio of the organic and inorganic powder blending agent is from 17 to 47%. In this case, it is preferable that the friction conditioner is approximately blended from 5 to 20%, the organic dust from 3 to 10%, the metal powder from 3 to 10% and the inorganic blending agent from 5 to 30%.

The feature of the composition of frictional material for use in brake linings according to the present fourth invention resides in that, the composition ratio of the total matrix fibers composed of the chopped glass fibers from 10 to 30% and the pulped aromatic polyamide fibers from 5 to 20% is from 15 to 40%, the phenolic resin type binder is from 17 to 20%, the organic and inorganic blending agents are from 40 to 68% based on 100% of the total volume.

In a case where the total matrix fibers are less than 15%, necessary strength of material cannot be ensured. On the other hand, in a case where the total matrix fibers are in excess of 40%, the wear amount is increased. While, in a case where the chopped glass fibers are less than 10%, the heatproof performance is worsened. On the other hand, in a case where the chopped glass fibers are in excess of 30%, the wear amount is increased. Also, in a case the pulped aromatic polyamide fibers are 5% or less, the wear amount is increased and in excess of 20%, the heatproof performance is insufficient.

The blending ratio of the phenolic resin type binder is from 17% to 20%. The strength of material is insufficient if aforesaid blending ratio is less than 17%, and on the other hand, necessary porosity cannot be ensured and the anti-fading performance is worsened if aforesaid blending ratio exceeds 20%.

The preferred blending ratio of the organic and inorganic powder is from 40 to 60% of total amount. In this case, it is preferable that the friction conditioner is from 5 to 25%, the organic dust from 3 to 10%, the metal powder from 3 to 10% and the inorganic blending agent from 10 to 40%.

The feature of the composition of frictional material for use in brake linings according to the present fifth invention resides in that, in the composition of frictional materials for use in brake linings matrix fibers are composed of the glass fibers and pulped polyparaphenylene terephthalamide fibers, and cryolite powder is contained from 5 to 30% based on 100% of total composition.

Hereupon, the ratio of the total matrix fibers is preferably from 20 to 50% based on 100% of the total composition of the frictional materials for use in brake linings. While, it is preferable that the ratio of the glass fibers is from 10 to 45%, the pulped polyparaphenylene terephthalamide fibers is from 5 to 30%. If the ratio of the total matrix fibers is less than 20%, the friction coefficient is lowered. To the contrary, if the ratio of the total matrix fibers exceeds 45%, the wear ratio is increased. While, the glass fibers are less than 10%, the heatproof performance is insufficient. On the other hand, in excess of 40%, the wear is increased. Also, when the pulped polyparaphenylene terephthalamide fibers are 5% or less, the wear ratio is increased and in excess of 30%, the heatproof performance is insufficient.

The preferred blending ratio of the phenolic resin type binder is from 15 to 25%. If aforesaid blending ratio is less than 15%, the strength of material is insufficient, and on the other hand, if said blending ratio exceeds 25%, necessary porosity cannot be ensured that the anti-fading performance is worsened.

The preferred ratio of the organic and inorganic powdery blending agent is from 25 to 65% of the total composition. In this case, it is preferable that the friction conditioner is blended approximately from 5 to 25%, the organic dust from 3 to 10%, the metal powder from 3 to 10% and inorganic blending agent from 10 to 40%.

In the present fifth invention, cryolite powder is contained at from 5 to 30% as the inorganic blending agent. This cryolite powder represses the fading phenomenon of the brake linings effectively when the pulped polyparaphenylene terephthal fibers are used as matrix fibers and the phenolic resin is used as a binder. Meanwhile, if the blending amount of the cryolite powder is less than 5%, the fading phenomenon is not effectively suppressed. On the other hand, if aforesaid blending amount exceeds 30%, other blending agents are relatively decreased and wear resistance performance tends to be worsened.

The feature of the composition of frictional material for use in brake linings according to the present sixth invention resides in that glass fibers and pulped aromatic polyamide fibers are used as matrix fibers, and zirconium oxide powder is cntained at a ratio from 0.5 to 10% based on 100% of the total composition.

The zirconium oxide powder has an effect on the friction coefficient to be increased remarkably, when the pulped aromatic polyamide fibers are used as matrix fibers and the phenolic resin is used as a binder. When the blending amount of the zirconium oxide powder is less than 0.5%, the friction coefficient is not increased remarkably, while when over 10%, the wear ratio of the material to be contact tends to be high. It is preferable to use powder minerals whose Mohs hardness is from 6 to 8 as zirconium oxide powder. Zirconium oxide having high Mohs hardness close to the perfect crystal tends to increase the wear ratio.

The preferred ratio of the total matrix fibers is from 20 to 50% based on 100% of the total composition of frictional material for use in brake linings. In this case, it is preferable that glass fibers are composed from 10 to 45% and pulped polyparaphenylene terephthalamide fibers are from 5 to 30%. When the total matrix fibers are less than 20%, the friction coefficient is lowered. On the other hand, when the aforesaid matrix fibers exceed 45%, the wear amount is increased. While, if the glass fibers are less than 10%, the heatproof performance is insufficient. On the other hand, if aforessaid glass fibers are over 40%, the wear ratio is increased. If the pulped polyparaphenylene terephthalamide fibers are 5% or less, the wear is increased, while when they are over 30%, the heatproof performance is insufficient.

The preferred blending ratio of a phenolic resin type binding is from 15 to 25%. When less than 15%, the strength of material is insufficient, while when over 25%, necessary porosity cannot be ensured and the anti-fading performance is worsened.

The preferred ratio of the organic and inorganic powder blending agents is from 25 to 65% of the total composition. Herein, it is preferable that the friction conditioner are composed approximately from 5 to 25%, the organic dust from 3 to 10%, the metal powder from 3 to 10% and the inorganic blending agent from 10 to 40%.

The conventional manufacturing method called as the mold method can be applied as it is to the method of manufacturing brake linings which uses the composition of the frictional materials in this invention. Namely, the matrix fibers, the phenolic resin powder binder and the organic and inorganic blending agents are sufficiently mixed and subjected to preliminary molding by charging the mixture in a cold mold and applying pressure at room temperature. The resulting preliminary molded product is then molded in a hot mold.

BRIEF DESCRIPTION OF THE DRAWINGS

FIGS. 1 and 2 show the results of Test Example 1 and Example 1:

FIGS. 3 to 5 show the test results of Example 2:

FIGS. 6 and 7 show the result of Test Example 2.

FIGS. 8 and 9 show the result of Test Example 3.

THE BEST MODE FOR EMBODYING THE INVENTION

Hereinafter, this invention is described concretely through test examples, operation examples and comparative examples of the composition of frictional material for use in brake linings.

[TEST EXAMPLE 1]

The composition of frictional materials for use in fifteen types of brake linings, shown in Table 1 as from No. 1 to No. 15, were prepared. In this Test Example, the chopped glass fibers used as matrix fibers had 3 mm fiber length and about 9 μm of fiber diameter.

TABLE 1

| No. | matrix fiber | | phenolic resin | barium sulfate | total matrix fibers |
|---|---|---|---|---|---|
| | glass | aromatic polyamide | | | |
| 1 | 50 | 0 | 20 | 30 | 50 |
| 2 | 35 | 15 | 20 | 30 | 50 |
| 3 | 25 | 25 | 20 | 30 | 50 |
| 4 | 15 | 35 | 20 | 30 | 50 |
| 5 | 0 | 50 | 20 | 30 | 50 |
| 6 | 35 | 0 | 20 | 45 | 35 |
| 7 | 20 | 15 | 20 | 45 | 35 |
| 8 | 17.5 | 17.5 | 20 | 45 | 35 |
| 9 | 15 | 20 | 20 | 45 | 35 |
| 10 | 0 | 50 | 20 | 45 | 35 |
| 11 | 20 | 0 | 20 | 60 | 20 |
| 12 | 15 | 5 | 20 | 60 | 20 |
| 13 | 10 | 10 | 20 | 60 | 20 |
| 14 | 5 | 15 | 20 | 60 | 20 |
| 15 | 0 | 20 | 20 | 60 | 20 |

Polyparaphenylene terephthalamide fibers partially ground into the shape of pulps were used as pulped aromatic polyamide fibers. Straight phenolic resin powder was used as phenolic resin. Only barium sulfate which has mean action for the friction and wear was used as organic and inorganic blending agents, so as to remarkably show the effects of friction and wear of the matrix fibers.

The materials for brake linings were blended on each composition by the ratio as shown in Table 1 and mixed for 10 minutes in a V-mixer. Thus obtained mixtures were charged in a cold mold and subjected to preliminary molding at room temperature under a pressure of 300 kg/cm² for one minute. Then the preliminary molding products were subjected to hot press at 155° C. and under a pressure of 700 kg/cm² for 10 minutes in a hot mold, released from the mold and then cured at 250° C. for 3 hours.

Each of the thus obtained brake lining materials was attached to a brake dynamometer and examined for the friction performance in accordance with the test method: JASO-C406-82. Further, wear performance was examined in accordance with the test method: JASO-C427-83. These results are collectively shown in FIGS. 1 and 2.

Figure 1:
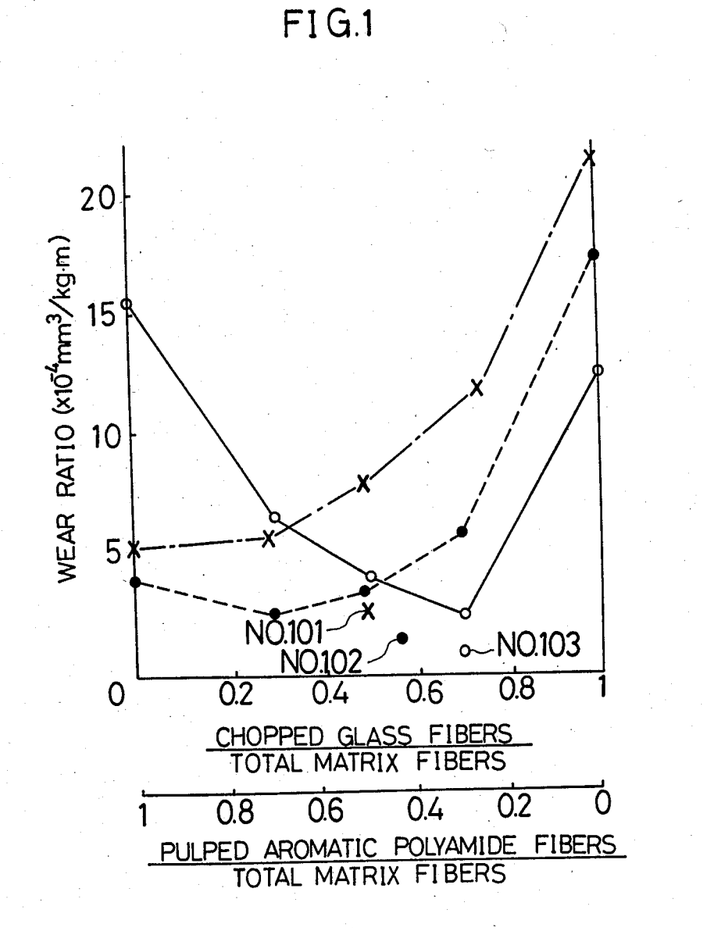
FIG. 1 is a diagram illustrating the relationship between the wear ratio of frictional material and the composition ratio of chopped glass fibers and pulped polyamide fibers constituting matrix fibers.
Figure 2:
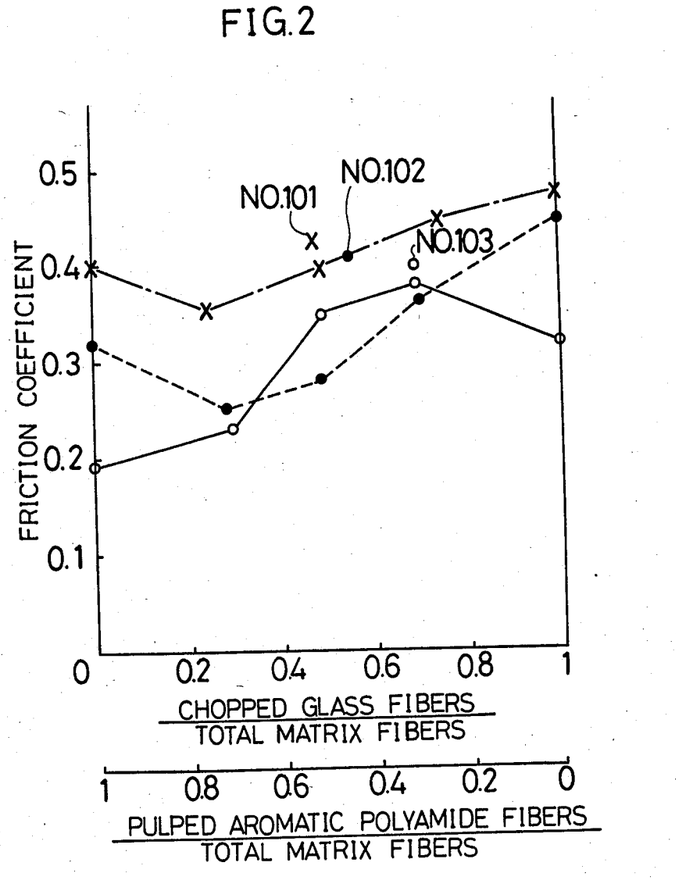
FIG. 2 is a diagram illustrating the relationship between the frictional coefficient of frictional material and the composition ratio of chopped glass fibers and pulped polyamide fibers.

FIG. 1 shows the wear ratio, taking the wear ratio ($\times 10^{-4}$ mm³/kgm) at the brake temperature of 200° C. before braking on the ordinate and the blending ratio of the chopped glass fibers and pulped aromatic polyamide fibers on the abscissa. The results for the test of the wear ratio are shown by the one dotted broken line including symbols "X" for the 20% blending ratio of the total matrix fibers, by the broken line including symbols of solid circles for the 35% blending ratio of the total matrix fibers, and by the solid line including symbols of blank circles for the 50% blending ratio of the total matrix fibers. FIG. 2 shows the result for the friction coefficient taking the friction coefficient of the second performance test 100 km/hr at braking deceleration of 0.6G on the ordinate and the blending ratio of the chopped glass fibers and the pulped polyamied fibers on the abscissa. Symbols and lines shown in FIG. 2 are the same as those in FIG. 1.

As shown in FIG. 1, the wear ratio increases abruptly as the composition ratio of the chopped glass fibers increase at the 20% total matrix fibers. In view of the practical use, the composition ratio of the chopped glass fibers is preferably 0.5 or less based on the total matrix fibers. The wear ratio abruptly increases in accordance with the increase of the composition ratio of the chopped glass fibers also at the 35% total matrix fibers. However, the lowest wear ratio is obtained at the composition ratio of the chopped glass fibers of about 0.3 based on the total matrix fibers. In view of the practical use, the composition ratio of the chopped glass fibers is, preferably, about from 0.1 to 0.6 based on the total matrix fibers. When the total matrix fibers are 50%, the wear ratio is increased regardless of whether the composition ratio of the chopped glass fibers is smaller or greater. In view of the practical use, the composition ratio of the chopped glass fibers is, preferably, about from 0.3 to 0.8 based on the total matrix fibers.

The friction coefficient tends to increase as the blending ratio of the total matrix fiber decreases as shown in FIG. 2. In view of the practical use, the chopped glass fibers can be used at any of composition ratio except for the range of 0.2 or less based on the total matrix fibers in the case where the total matrix fibers are at 50%.

[EXAMPLE 1]

Three types of compositions of frictional material for use in brake linings include No. 101, No. 102 and No. 103 shown in Table 2 were prepared. Each of the compositions was molded into brake lining by the same method as in Test Example 1. Further, each of the thus obtained brake lining was examined for the frictional and wear performance in the same manner as in Test Example. The test results are shown collectively in FIGS. 1 and 2. The test results are shown by symbols of "X" and reference No. 101 for the brake lining No. 101, by symbols of solid circles and reference No. 102 for the brake lining No. 102, and by symbols of blank circles and reference No. 103 for the brake lining No. 103. All of the brake linings showed excellent friction performance, that is, the wear ratio of $3 \times 10^{-4}$ mm³/kgm or less and the friction coefficient of 0.4 or more.

TABLE 2

| blending agent | | No. 101 | No. 102 | No. 103 |
|---|---|---|---|---|
| matrix fiber | glass fiber | 10 | 20 | 35 |
| | aromatic polyamide | 10 | 15 | 15 |
| binder | phenolic resin | 20 | 20 | 20 |
| lubricant | graphite and metal sulfides | 15 | 15 | 10 |
| organic dust | cashew dust | 5 | 5 | 4 |
| metal powder | copper powder | 5 | 5 | 4 |
| inorganic blending agent | magnesium oxide zirconium oxide barium sulfate cryolite | 35 | 20 | 12 |

[EXAMPLE 2]

Five types of compositions of frictional materials for use in brake linings including from No. 104 to No. 108 shown in Table 3 were prepared. In this Example 2, the matrix fibers and the phenolic resin were same as those of Example 1. A matrix of graphite and metal sulfide was used as a frictional conditioner, the cashew dust was used as organic dust and the copper powder with about from 500 to 10 μm particle diameter was used as metal powder. Magnesium oxide, zirconium oxide, barium sulfate and cryolite, whose blending ratio was about 2:1 to 2:3, were used as an inorganic blending agent.

The frictional material for use in brake linings were blended on each compositions by the ratio as shown in Table 3 and mixed for 10 minutes in a V-mixer. The mixtures thus obtained were charged in a cold mold and subjected to preliminary molding by applying a pressure of 300 kg/cm² for one minute at a room temperature Then, the preliminary molded products were subjected to a hot press at 155° C. and under a pressure of 300 kg/cm² for 10 minutes in a hot mold, released from the hot mold and then cured at 250° C. for 3 hours.

TABLE 3

| blending agent | | No. 104 | No. 105 | No. 106 | No. 107 | No. 108 |
|---|---|---|---|---|---|---|
| matrix fiber | glass fiber | 20 | 20 | 25 | 15 | 25 |
| | aromatic polyamide | 10 | 10 | 5 | 15 | 15 |
| binder | phenolic resin | 19 | 19 | 19 | 19 | 19 |
| lubricant | graphite and metal sulfides | 14 | 19 | 16 | 19 | 22 |
| organic dust | cashew dust | 6 | 5 | 5 | 5 | 3 |
| metal powder | copper powder | 5 | 4 | 5 | 5 | 3 |
| inorganic blending agent | magnesium oxide zirconium oxide barium sulfate cryolite | 26 | 24 | 25 | 22 | 13 |

Herein, two types of brake linings as the conventional brake linings were prepared, one was asbestos type brake linings mainly constituted by the asbestos on the market and the other was semi-metallic type brake linings mainly constituted by the semi-metallic on the market. The brake linings manufactured by Sumitomo Electronic Works Ltd. material code: M 2228 were prepared as asbestos type brake linings. The composition of the Sumitomo's brake linings was unknown due to an article on the market, but distributed well on the market. While, the brake linings manufactured by Akebono Brake Co. material code AKV3510 was prepared as semi-metallic type. Also, the composition of this Akebono's was unknown due to an article on the market, but also distributed well on the market.

Figure 3:
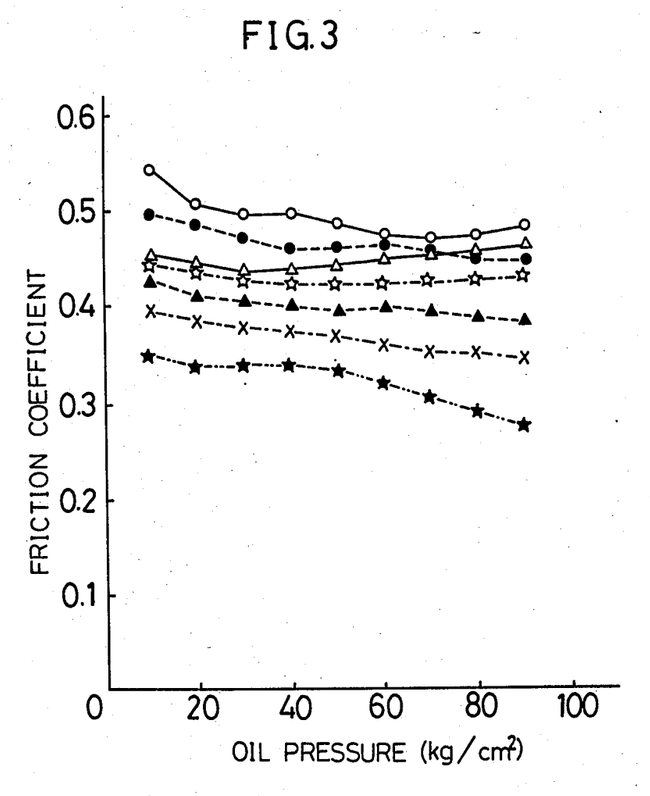
FIG. 3 is a diagram illustrating the relationship between the friction coefficient and the oil pressure acting on the brake linings.
Figure 4:
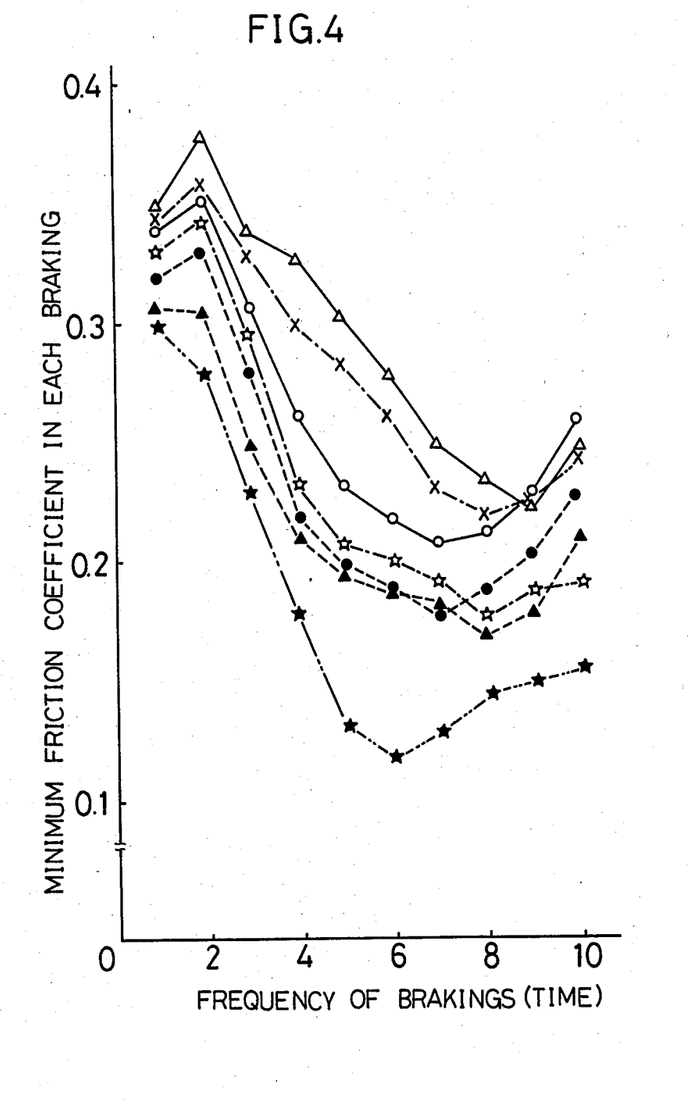
FIG. 4 is a diagram illustrating the relationship between the minimum friction coefficient in each braking and the frequency of braking.
Figure 5:
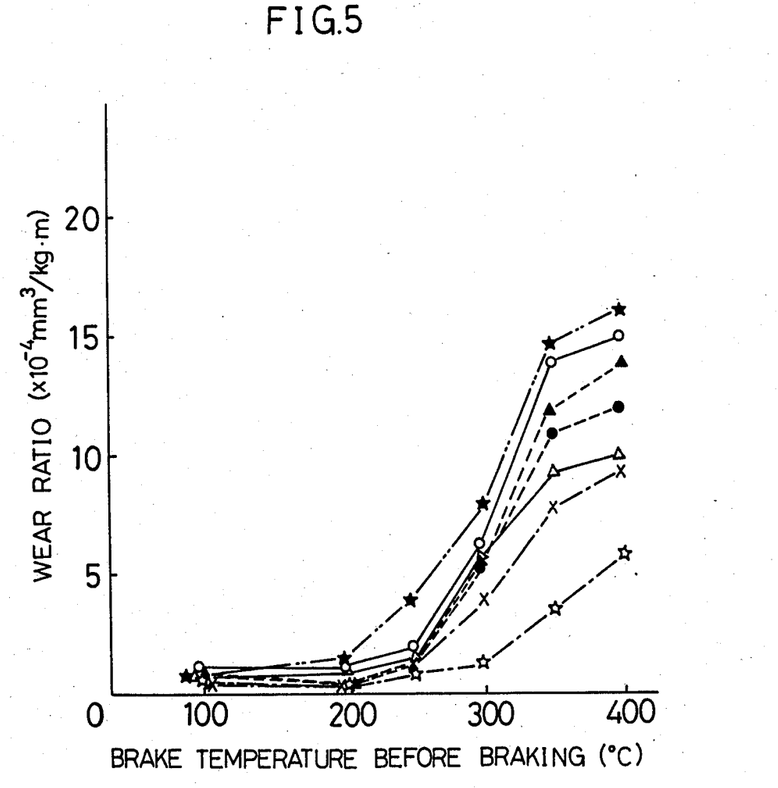
FIG. 5 is a diagram illustrating the relationship between the wear ratio and the brake temperature before braking.

Each of the brake lining materials was attached to a brake dynamometer and examined for the friction performance in accordance with the test method: JASO-C406-82. The brake was PD51S type, the rotor was 18 mm ventilated type and inertia (load) was 5.5 kg.cm.sec$^2$. Further, the wear resistance performance was examined in accordance with the test method: JASO-C427-83. In this examination, inertia was set at 5.0 kg.cm.sec$^2$. FIG. 3 shows the results of the examinations collectively illustrating the relationship between the frictional coefficient and the oil pressure. While, FIG. 4 shows the relationship between the minimum friction coefficient in each braking and the frequency of brakings, FIG. 5 shows the relationship between the wear ratio and the brake temperature before braking. The test results of brake linings are shown by the thick solid line including symbols of blank circles for No. 104, by the thick broken line including symbols of solid circles for No. 105, by the solid line including symbols of blank triangles for No. 106, by the broken line including symbols of solid triangles for No. 107, by the one dotted broken line including symbols of 'X' for No. 108, by the two dotted broken line including symbols of solid stars for the asbestos type, and by the one dotted broken line including symbols of blank stars for the semi-metallic type.

As shown in FIG. 3, each of the brake linings composed of the compositions shown in Nos. 104 to 108 in this fourth invention has a relatively high friction coefficient of about 0.4 or more regardless of whether the pressure was large or small in a range from 20 to 80 kg/cm$^2$. The friction coefficient of about 0.4 or more was higher than the friction coefficients of the conventional asbestos type brake linings. Especially, the composition having more inorganic blending agent and less blending ratio of the frictional conditioner showed higher friction coefficient.

Regarding fadings as shown in FIG. 4, the frictional materials obtained by the compositions of frictional materials for use in brake linings of from No. 104 to No. 108 in this fourth invention showed the higher minimum friction coefficient in each braking and less fadings compared to the conventional asbestos type's friction materials.

Further, regarding the relationship between the wear ratio and the brake temperature before braking, less wear ratio than that of the conventional asbestos type brake lining was exhibited.

[TEST EXAMPLE 2]

Four types of compositions of frictional material for use in brake linings including No. 109 and No. 110, Comparative Examples 1 and 2 as shown in Table 4 were prepared. In these brake linings of Nos. 109 and 110, 'Kevlar ®' (registered trade name) fibers on the market were prepared as pulped paraphenylene terephthalamide fibers and as an inorganic blending agent, barium sulfate, magnesium oxide and cryolite powder were prepared. Regarding each of other compositions, the same one used in Example 2 as above was prepared. Also, for Comparative Example 1, asbestos were prepared as matrix fibers, and other compositions such as an binder, lubricant, organic dust, metal powder and inorganic blending agent were used the same ones as shown in Table 4.

TABLE 4

| blending agent | | No. 109 | No. 110 | Comparative Example 1 | Comparative Example 2 |
|---|---|---|---|---|---|
| matrix fiber | glass fiber | 20 | 20 | 20 | 20 |
| | aromatic polyamide | 10 | 10 | 10 | 10 |
| binder | phenolic resin | 19 | 19 | 19 | 19 |
| lubricant | graphite and metal sulfides | 15 | 15 | 15 | 15 |
| organic dust | cashew dust | 5 | 5 | 5 | 5 |
| metal powder | copper powder | 5 | 5 | 5 | 5 |
| inorganic blending agent | barium sulfate, magnesium oxide and cryolite | 23 | 20 | 26 | 23 |
| | aluminum oxide | 0 | 0 | 0 | 0 |
| | zirconium oxide | 3 | 6 | 0 | 0 |

Further, for Comparative Example 2, the compositions including polymetaphenylene isophthalamide fibers as matrix fibers as shown in Table 4 were prepared. This polymetaphenylene isophthalamide fibers are known as 'Normex ®' (registered trade name), which are one of the aromatic polyamide fibers, manufactured by Dupont Co.

Each of the compositions was molded into frictional material for use in brake linings by the same method as in Example 2. Further, each of the brake linings thus obtained was examined for the frictional and wear performance in the same manner as Example 2.

Figure 6:
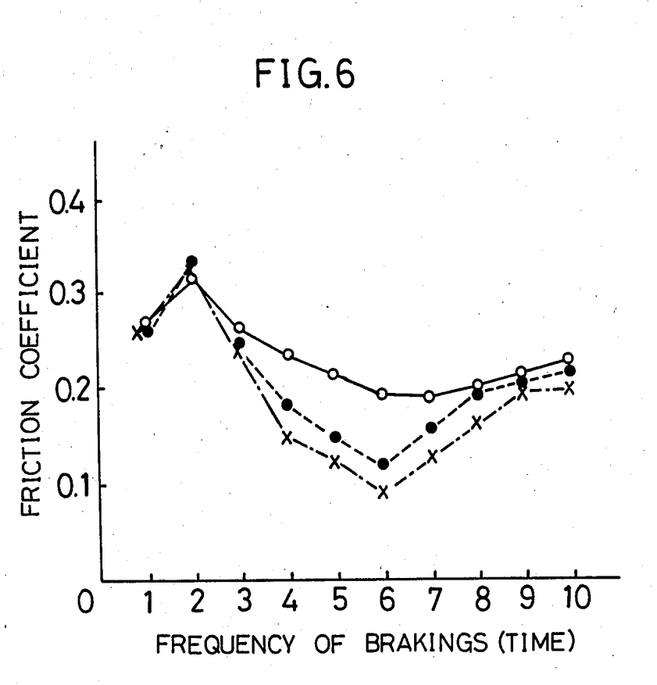
FIG. 6 is a diagram illustrating the relationship between the minimum friction coefficient in each braking and the frequency of braking.
Figure 7:
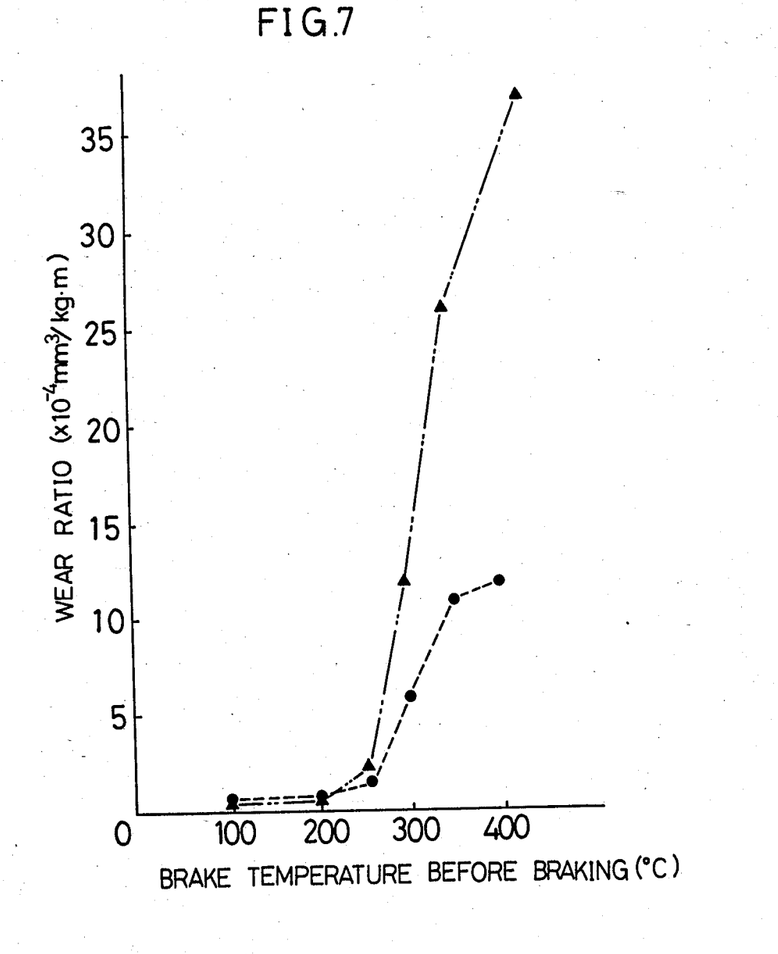
FIG. 7 is a diagram illustrating the relationship between the brake temperature before braking and the wear ratio.

The test results are shown collectively in FIGS. 6 and 7. FIG. 6 shows the relationship between the minimum friction coefficient in each time of braking and the frequency of brakings, FIG. 7 shows the relationship between the brake temperature before braking and the wear ratio. The test results of the brake linings are shown by the thick solid line including symbols of blank circles for No. 109, by the thick broken line including symbols of solid circles for No. 110, by the one dotted broken line including symbols 'X' for Comparative Example 1, and by the two dotted broken line including symbols of solid triangles for Comparative Example 2.

FIG. 6, which takes the fadings as the minimum friction coefficient in each braking, is the graph showing the results of the first fading test in the examination method provided in JASO-C-406-82. The aforesaid graph exhibits that the fadings happen frequently according to the decrease of the minimum friction coefficient caused by the increase of the frequency of the brakings. FIG. 6 shows the decrease of the minimum frictional coefficient of the brake linings of Nos. 109 and 110 caused by the increase of the frequency of the braking is less than that of those brake linings in Comparative Example 1.

FIG. 7 shows the relationship between the brake temperature before braking and the wear ratio and shows the wear ratio at the high temperature of more than 250° C. is high for Comparative Example 2 which used polymethaphenylene fibers as matrix fibers.

Regarding the average friction coefficient and the wear ratio, etc. of the frictional materials for use in brake linings in Nos. 109 and 110, each performance was examined through the method of JASO-C-427-83. The examination showed the aforesaid frictional materials had the equal or higher performance than that of the conventional frictional materials using asbestos as matrix fibers.

[TEST EXAMPLE 3]

Four types of compositions of frictional materials for use in brake linings including No. 111, No. 112, Comparative Example 3 and 4 as shown in Table 5 were prepared. Herein the compositions of frictional materials for use in brake linings of Nos. 111 and 112, the compositions such as matrix fibers, binder, organic dust and metal powder were the same as those prepared in Example 2. Barium sulfate, magnesium oxide and the zirconium oxide powder with average particle diameter 8 and Mohs hardness 7 were prepared as an inorganic blending agent. In Comparative Example 3, barium sulfate, magnesium oxide and cryolite were used as inorganic blending agent, but zirconium oxide powder was not used therein. In Comparative Example 4, barium sulfate, magnecium oxide, cryolite and aluminium oxide were used as an inorganic blending agent, but zirconium oxide powder was not used herein. In Comparative Examples 3 and 4, matrix fibers, a binder, lubricant, organic dust and metal powder were prepared with the same blending ratio as Nos. 111 and 112 as shown in Table 5.

Each of the compositions was molded into brake linings through the same method as that of Example 2.

Further, each of the brake linings thus obtained was attached to a brake dinamometer and examined. Concerning the friction coefficient, the friction coefficient at the speed of 100 km/hr was measured according to the second performance test of the test method JASO-C406-82. Regarding the wear ratio, each wear ratio was measured as that in different temperature, according to the test method JASO-C427-83. The results of the above tests are shown collectively in FIGS. 8 and 9.

Figure 8:
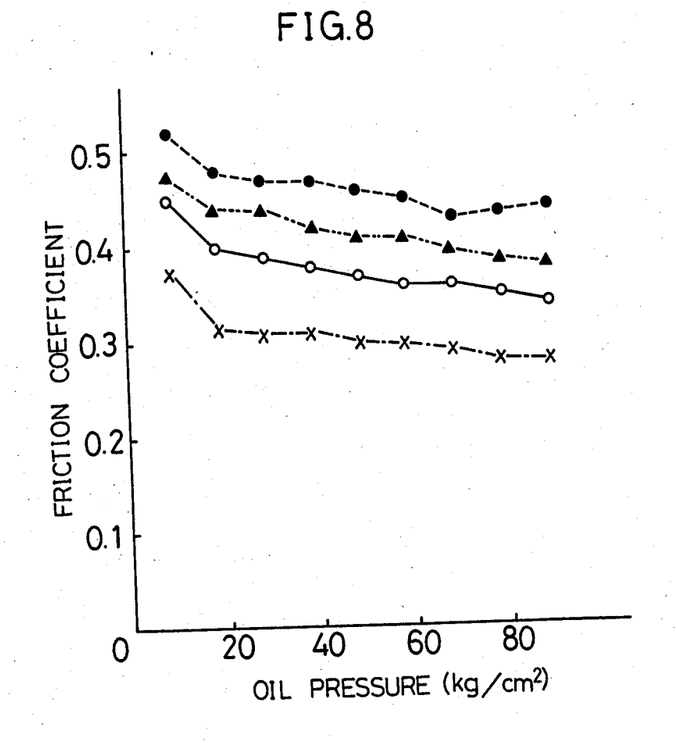
FIG. 8 is a diagram illustrating the relationship between the friction coefficient of four types of brake linings and the oil pressure applied to friction test samples.
Figure 9:
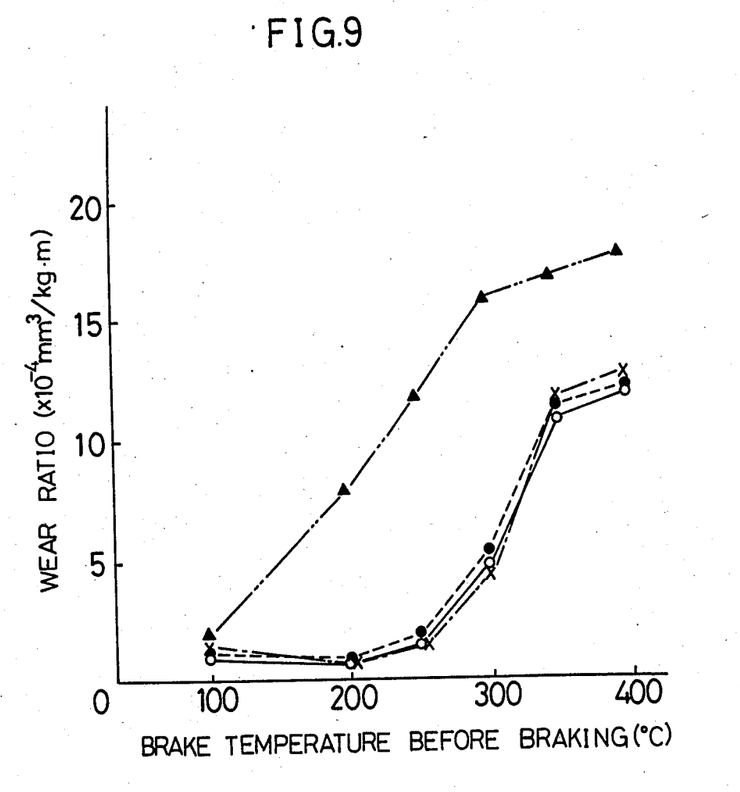
FIG. 9 is a diagram illustrating the relationship between the wear ratio of the same four types of brake linings and the brake temperature before braking.

FIG. 8 shows the friction coefficient taking the friction coefficient on the ordinate and the oil pressure applied to a friction test sample on the abscissa. The test results are shown by the solid line including symbols of blank circles for No. 111, by the broken line including symbols of solid circles for No. 112, by the one broken dotted line including symbols of 'X' for Comparative Example 3 and by the two dotted broken line including symbols of solid triangles for Comparative Example 4. FIG. 9 shows the results of the wear ratio taking the wear ratio ($\times 10^{-4}$ mm$^3$/kgm) on the ordinate and the broken temperature before braking on the abscissa. Symbols and lines in FIG. 9 is the same as those in FIG. 8.

According to FIG. 8, the friction coefficients, as the whole, generally tend to decrease a little according to the increase of oil pressure. The friction coefficients were from 0.52 to 0.45 for No. 112, from 0.48 to 0.38 for Comparative Example 4, from 0.45 to 0.34 for No. 111 and from 0.38 to 0.28 for Comparative Example 3. No. 112, Comparative Example 4 and No. 111, except Comparative Example 3, showed preferable high friction coefficient.

According to FIG. 9, that the wear ratio of Comparative Example 4 showed the results of sudden increase when the brake temperature before braking was 200° C. or more. On the other hand, the wear ratio of No. 111, No. 112 and comparative example 3 showed the results of comparatively stability and lowness when the brake temperature before braking was less than about 250° C. and the results of sudden increase if the brake temperature was over about 300° C.

According to the results of FIGS. 8 and 9, it was confirmed that the friction coefficient of No. 111 and No. 112 were high and the wear ratio were low. Also, the friction coefficient of Comparative Example 3 was low. The wear ratio of Comparative Example 4 was high at the temperature of 250° C. or less. According to the above results, it was confirmed that Comparative Examples 3 and 4 were not practical.

What is claimed is:

1. A resin molded composition of frictional material for use in brake linings, consisting essentially of:
    matrix fibers composed of glass fibers and pulped polyamide fibers at the ratio of from 2:3 to 4:1 and constituting from 40 to 60% by volume based on 100% by volume of the total composition;

TABLE 5

| blending agent | | No. 111 | No. 112 | Comparative Example 3 | Comparative Example 4 |
|---|---|---|---|---|---|
| matrix fiber | glass fiber | 20 | 20 | 20 | 20 |
|  | aromatic polyamide | 10 | 10 | 10 | 10 |
| binder | phenolic resin | 17 | 17 | 17 | 17 |
| frictional conditioner | graphite and metal sulfides (M$_0$S$_2$ etc) | 20 | 20 | 20 | 20 |
| organic dust | cashew dust | 5 | 5 | 5 | 5 |
| metal powder | copper powder | 5 | 5 | 5 | 5 |
| inorganic blending agent | barium sulfate and magnesium oxide | 5 | 13 | 23 | 13 |
|  | cryolite | 18 | 10 | 0 | 10 | a phenolic resin binder of from 17 to 23% by volume based on 100% by volume of the total composition; and organic and inorganic powder blending agents comprising at least zirconium oxide powder and cryolite powder and constituting from 17 to 47% by volume based on 100% by volume of the total composition.

2. A resin molded composition of frictional material for use in brake linings, consisting essentially of:

matrix fibers composed of glass fibers and pulped polyamide fibers at the ratio of from 1:9 to 7:3 by volume and constituting from 30 to 40% by volume based on 100% by volume of the total composition;

a phenolic resin binder of from 17 to 23% by volume based on 100% by volume of the total composition; and organic and inorganic blending agents comprising at least zirconium oxide powder and cryolite powder and constituting from 37 to 53% by volume based on 100% by volume of the total composition.

3. A resin molded composition of frictional material for use brake linings, consisting essentially of:

matrix fibers composed of glass fibers and pulped polyamide fibers at the ratio of from 1:9 to 1:1 by volume and constituting from 15–30% by volume based on 100% by volume of the total composition;

a phenolic resin binder of from 17 to 23% by volume based o 100% by volume of the total composition;

organic and inorganic powdery blending agents comprising at least zirconium oxide powder and cryolite powder and constituting from 47 to 68% by volume based on 100% by volume of the total composition.

4. The resin molded composition according to claim 1, wherein said zirconium oxide powder is from 0.5 to 10% by volume, and said cryolite powder is from 5 to 30% by volume, respectively based on 100% by volume of the total composition.

5. The resin molded composition according to claim 2, wherein said zirconium oxide powder is from 0.5 to 10% by volume and said cryolite powder is from 5 to 30% by volume, respectively based on 100% by volume of the total composition.

6. The resin molded composition according to claim 3, wherein said zirconium oxide powder is from 0.5 to 10% by volume, and said cryolite powder is from 5 to 30% by volume, respectively based on 100% volume of the total composition.

7. The resin molded composition according to claim 1, wherein the Mohn hardness of said zirconium oxide powder is from 6 to 7.

8. The resin molded composition according to claim 2, wherein the Mohs hardness of said zirconium oxide powder is from 6 to 7.

9. The resin molded composition according to claim 3, wherein the Mohs hardness of said zirconium oxide powder is from 6 to 7.

10. A resin molded composition of frictional material for use in brake linings, consisting essentially of:

matrix fibers composed of from 10 to 45% by volume of glass fibers and from 5 to 30% by volume of pulped polyparaphenylene terephthalamide fibers with the sum of said glass fibers and said pulped polyparaphenylene terephthalamide contents being from 20 to 50% by volume;

from 15 to 25% by volume of a phenolic resin binder; and from 5 to 25% by volume of a friction conditioner, from 3 to 10% by volume of an organic dust, from 3 to 10% by volume of metal powder, and from 10 to 40% by volume of an inorganic blending agent comprising at least zirconium oxide powder and cryolite powder, with the sum of said friction conditioner, said organic dust, said metal powder and said inorganic blending agent being from 25 to 65% by volume, respectively based on 100% by volume of the total composition.

11. A resin molded composition of frictional material for use in brake linings, consisting essentially of:

matrix fibers composed of from 10 to 45% by volume of glass fibers and from 5 to 30% by volume of pulped polyparaphenylene terephthalamide fibers with the sum of said glass fibers and said pulped polyparaphenylene terephthalamide fibers contents being from 20 to 50% by volume;

from 15 to 25% by volume of a phenolic resin binder; and from 5 to 25% by volume of at least one friction conditioner selected from the group consisting of graphite, molybdenum disulfide, lead sulfide, antimony trisulfide and a mixture thereof; from 3 to 10% by volume of cashew dust; from 3 to 10% by volume of copper powder, brass powder and mixtures thereof; and from 10 to 40% by volume of zirconium oxide powder, cryolite powder or mixtures thereof.

12. The resin molded composition of claim 11, wherein said 10 to 40% by volume of zirconium oxide, cryolite or mixtures thereof, further comprises barium sulfate, magnesium oxide or mixtures thereof.

* * * * *